United States Patent Office 3,062,704
Patented Nov. 6, 1962

3,062,704
ORGANO-PHOSPHOROUS PESTICIDE
Sidney B. Richter, Chicago, Ill., assignor to Velsicol Chemical Corporation, Chicago, Ill., a corporation of Illinois
No Drawing. Filed Oct. 28, 1960, Ser. No. 65,573
8 Claims. (Cl. 167—22)

This invention relates to new chemical compositions of matter. More specifically, this invention relates to new chemical compounds of the formula:

$$CH_3-CH-(CH_2)_n-\overset{O}{\underset{\downarrow}{S}}-(CH_2)_n-CH-CH_3$$
$$\underset{\underset{S}{\overset{\|}{S}}}{\overset{|}{S-P(OR)_2}} \quad O \quad \underset{\underset{S}{\overset{\|}{S}}}{\overset{|}{(RO)_2P-S}}$$

wherein $n$ is a whole number from 0 to 1, and R is an unsubstituted alkyl hydrocarbon radical containing from 1 to 3 carbon atoms. These new compounds, useful as pesticides, are the 2:1 addition products of the dialkyl phosphorodithioates $HS(S)P(OR)_2$, where R is as defined above, with divinyl sulfone or diallyl sulfone. Divinyl sulfone is a chemical of commerce, while diallyl sulfone can be prepared as described by Backer et al., Rec. Trav. Chim., 67, pp. 451-8 (1948).

The new compounds of this invention can be prepared readily by the addition of two molecular proportions of the dialkyl phosphorodithioate to each molecular proportion of the sulfone employed. While these are satisfactory proportions of reactants, it is preferred to use a slight excess of the dialkyl phosphorodithioate. The reaction can be carried out satisfactorily in the absence of a solvent, but relatively inert solvents or diluents such as benzene, xylene, or toluene can be used if desired. It is also desirable to add a small amount of an oxidation inhibitor such as hydroquinone to the reaction mixture. The reaction temperature is not critical, but reaction temperatures in the range from about normal room temperature to about 100° C. (or the reflex temperature of the solvent or diluent, if one is used) are preferred. While the exact reaction time is dependent on a variety of factors, the addition reactions are generally complete within 24 hours. When the reaction is completed, the reaction mixture is cooled and taken up in a suitable solvent, if one has not already been used to run the reaction. The solution is then washed, first with a dilute aqueous solution of a base such as sodium carbonate to remove any excess acid reactant, and then with water. The solution is dried over an anhydrous drying agent such as sodium sulfate, and filtered. The solvent is then distilled off in vacuo to leave a residue of the desired addition product, which is often sufficiently pure for pesticidal use without further purification. If desired, however, it can be purified by fractional distillation or other techniques known to those skilled in the art.

Compounds of this invention in which $n$ is 0 are obtained by using divinyl sulfone as the reactant with the dialkyl phosphorodithioate, while compounds in which $n$ is 1 are obtained by using diallyl sulfone.

The manner in which the new compounds of this invention can be prepared is illustrated in the following examples.

EXAMPLE 1

*Preparation of the 2:1 Addition Product of O,O-Dimethyl Phosphorodithioate and Divinyl Sulfone*

Divinyl sulfone (59 g.; 0.5 mol), hydroquinone (0.2 g.), and benzene (500 ml.) were placed in a one-liter round-bottom flask fitted with a reflux condenser, mechanical stirrer, and internal thermometer. The solution was heated to reflux temperature with stirring and was then treated drop wise with O,O-dimethyl phosphorodithioate (240 g.; 1.5 mols) over a period of 2¼ hours. Reflux conditions were maintained for approximately 24 hours. The solution was allowed to cool by standing at room temperature, washed first with about 500 ml. of a 10% aqueous sodium carbonate solution, then with water, dried over anhydrous sodium sulfate, and filtered. The benzene was then distilled off in vacuo (final traces with a mechanical vaccum pump). This work-up indicated that the reaction was not yet complete. To complete the reaction the residue from the work-up was placed in a 500 ml. round-bottom flask fitted with the same equipment as the 1-liter flask. Hydroquinone (0.2 g.) and O,O-dimethyl phosphorodithioate (100 g.) were added, and the solution was heated for 25 hours with stirring at 75° C. The product was cooled, dissolved in benzene, washed with about 400 ml. of 10% aqueous sodium carbonate solution, washed with water, dried over anhydrous sodium sulfate, and filtered. The benzene was removed by distilling in vacuo (final traces with a mechanical vacuum pump), and the residue was filtered through Filter-Cel diatomaceous silica filtering aid to give 175 grams of bis-(1-O,O-dimethyl-phosphorodithio)ethyl sulfone, a viscous oil having an index of refraction (D line) at 20° C. of 1.5600 and the following elemental analysis as calculated for $C_8H_{20}P_2S_5O_6$:

|  | S | P |
|---|---|---|
| Theoretical, percent | 36.90 | 14.27 |
| Found, percent | 36.34 | 13.37 |

Other useful compounds within the scope of this invention can be prepared in the manner detailed above. Given in the following examples are the reactants required to prepare the indicated named compounds of this invention:

EXAMPLE 2

Divinyl sulfone+O,O-diethyl phosphorodithioate=bis (1-O,O-diethylphosphorodithio)ethyl sulfone.

EXAMPLE 3

Diallyl sulfone+O,O-dimethyl phosphorodithioate=bis (2-O,O-dimethylphosphorodithio)propyl sulfone.

EXAMPLE 4

Diallyl sulfone+O,O-diethyl phosphorodithioate=bis (2-O,O-diethylphosphorodithio)propyl sulfone.

EXAMPLE 5

Divinyl sulfone+O,O-di-n-propyl phosphorodithioate= bis(1,O,O-di-n-propylphosphorodithio)ethyl sulfone.

EXAMPLE 6

Diallyl sulfone+O,O-di-n-propyl phosphorodithioate= bis(2-O,O-di-n-propylphosphorodithio)propyl sulfone.

EXAMPLE 7

Divinyl sulfone+O,O-diisopropyl phosphorodithioate= bis(1-O,O-diisopropylphosphorodithio)ethyl sulfone.

EXAMPLE 8

Diallyl sulfone+O,O-diisopropyl phosphorodithioate= bis(2-O,O-diisopropylphosphorodithio)propyl sulfone.

The new compounds of the present invention are useful as pesticides, particularly as insecticides and miticides. Pesticidal compositions of this invention are prepared by mixing one or more of the new compounds of this invention with inert carriers to provide formulations adapted for ready and efficient application with conventional applicator equipment to the side of the pest infestation. For example, pesticidal compositions or formulations according to this invention are prepared in the form of solids or liquids. Solid compositions are preferably in the form of dusts. These are prepared to give homogeneous, free-flowing dusts by admixing the active compound or compounds of this invention with finely divided solids such as the talcs, natural clays, pyrophyllite, diatomaceous earth, fuller's earth or flours such as walnut shell, wheat, redwood, soya bean, or cottonseed flours. Other inert solid carriers of the type ordinarily used in preparing pest control compositions in dusts or powdered form can also be used.

Liquid compositions according to this invention are prepared by admixing one or more of the new compounds of this invention with a suitable inert liquid diluent. In some cases the compounds are sufficiently soluble in the common pesticide solvents such as kerosene, xylene, fuel oil, the alkylated naphthalenes, and the like so that they can be used directly as solutions in these substances. However, the pesticidal compositions of this invention can also contain a surface-active agent of the kind used in the art to enable the active compounds to be readily dispersed in water or other liquids to give sprays, which are a preferred method of applying the active compounds of this invention. The surface-active agents can be of the anionic, cationic or nonionic types. Typical examples of such surface-active agents are sodium stearate, potassium laurate, morpholine oleate, sodium lauryl sulfate, methyl cellulose, sodium salt of ligninsulfonic acid, polyglycol fatty acid esters, quaternary ammonium salts such as lauryl dimethyl benzyl ammonium chloride, amine hydrochlorides such as laurylamine hydrochloride, alkylated aryl polyether alcohols such as the condensation product of diamylphenol with ethylene oxide, and the like. Mixtures of such agents can be used to combine or modify properties. The proportion of these agents will ordinarily vary from about 1% or less to about 15% by weight of the pesticidal compositions. Other pesticides as well as such substances as fertilizers, activators, adhesives, spreaders, and synergists can be added to these formulations if desired. The manner in which typical pesticidal compositions according to this invention can be prepared is illustrated in the following examples. All quantities given are in parts by weight.

EXAMPLE 9

*Preparation of an Emulsifiable Concentrate*

The following ingredients are blended thoroughly until a homogeneous liquid concentrate is obtained. This concentrate is mixed with water to give an aqueous dispersion containing the desired concentration of active compound for use as a spray.

Bis(1-O,O-dimethylphosphorodithio)ethyl sulfone ____ 25
Sodium lauryl sulfate _____ 2
Sodium lignin sulfonate _____ 3
Kerosene _____ 70

EXAMPLE 10

*Preparation of a Wettable Powder*

The following components are mixed intimately in conventional mixing or blending equipment and are then ground to a powder having an average particle size of less than about 50 microns. The finished powder is dispersed in water to give the desired concentration of active compound.

Bis(1-O,O-diethylphosphorodithio)ethyl sulfone ___ 75.00
Fuller's earth _____ 22.75
Sodium lauryl sulfate _____ 2.00
Methyl cellulose _____ .25

EXAMPLE 11

*Preparation of an Oil-Dispersible Powder*

The following components are blended and ground as described in the previous example to give a powder which can be dispersed in oil to form a spray containing the desired concentration of active compound.

Bis(2-O,O-dimethylphosphorodithio)propyl sulfone __ 70
Condensation product of diamylphenol with ethylene oxide _____ 4
Fuller's earth _____ 26

EXAMPLE 12

*Preparation of a Dust*

The following ingredients are mixed thoroughly and then ground to an average particle size of less than about 50 microns to give a dust suitable for application with conventional dusting equipment.

Bis(1-O,O-dimethylphosphorodithio)ethyl sulfone ___ 20
Talc _____ 80

EXAMPLE 13

*Preparation of a Granular Formulation*

The following ingredients are mixed with sufficient water to form a paste, which is then extruded, dried, and ground to give granules, preferably from about $\frac{1}{32}$ to $\frac{1}{4}$ inch in diameter. The granules are applied with fertilizer spreader equipment or other conventional apparatus. The dextrin in this formulation serves as a binding agent.

Bis(2-O,O-dimethylphosphorodithio)propyl sulfone __ 10
Fuller's earth _____ 66
Dextrin _____ 20
Sodium lignin sulfonate _____ 3
Kerosene _____ 1

I claim:
1. A compound of the formula

$$CH_3-CH-(CH_2)_n-\overset{O}{\underset{\parallel}{S}}-(CH_2)_n-CH-CH_3$$
$$\underset{\underset{S}{\parallel}}{S-P(OR)_2} \quad O \quad \underset{\underset{S}{\parallel}}{(RO)_2P-S}$$

wherein $n$ is a whole number from 0 to 1 and R is an unsubstituted alkyl hydrocarbon radical containing from 1 to 3 carbon atoms.
2. Bis(1-O,O-dimethylphosphorodithio)ethyl sulfone.
3. Bis(1-O,O-diethylphosphorodithio)ethyl sulfone.
4. Bis(2-O,O-dimethylphosphorodithio)propyl sulfone.
5. Bis(2-O,O-diethylphosphorodithio)propyl sulfone.
6. Bis(2-O,O-dipropylphosphorodithio)propyl sulfone.
7. An insecticidal and miticidal composition comprising an inert carrier and a toxic amount of a compound of claim 1.
8. A method of destroying undesirable insects and mites which comprises contacting these pests with an insecticidal and miticidal composition comprising an inert carrier and as the essential active ingredient, in a quantity which is toxic to said pests, a compound of claim 1.

References Cited in the file of this patent

UNITED STATES PATENTS

| | | |
|---|---|---|
| 2,884,353 | Christman | Apr. 28, 1959 |
| 2,885,430 | Scherer | May 5, 1959 |
| 2,929,832 | Schrader | Mar. 22, 1960 |

FOREIGN PATENTS

| | | |
|---|---|---|
| 515,666 | Canada | Aug. 16, 1955 |
| 1,014,988 | Germany | Sept. 5, 1957 |
| 1,190,783 | France | Oct. 15, 1959 |